United States Patent [19]

Davis

[11] Patent Number: 5,671,540
[45] Date of Patent: Sep. 30, 1997

[54] LASER BEAM TRACK ALIGNMENT SAFETY DEVICE

[76] Inventor: Daniel S. Davis, 6814 Whiteoak Dr., Pensacola, Fla. 32503

[21] Appl. No.: 314,317

[22] Filed: Sep. 28, 1994

[51] Int. Cl.⁶ .................................................. E01B 35/10
[52] U.S. Cl. ........................ 33/287; 33/651.1; 33/DIG. 21
[58] Field of Search .............................. 33/286, 287, 645, 33/651, 651.1, 114, 521, DIG. 21

[56] References Cited

U.S. PATENT DOCUMENTS

| 3,751,169 | 8/1973 | Fornerod | 33/287 |
| 4,155,648 | 5/1979 | Ferguson | 33/286 |
| 4,904,081 | 2/1990 | Miyahara | 33/286 |
| 5,036,594 | 8/1991 | Kesler et al. | 33/287 |
| 5,157,840 | 10/1992 | Henttinen | 33/287 |

FOREIGN PATENT DOCUMENTS 2841391  4/1979  Germany.

*Primary Examiner*—Christopher W. Fulton

[57] ABSTRACT

A new and improved laser beam track alignment safety device with a tube having an inner surface and an outer surface. A first metal housing has an opening therein. The opening of the first metal housing is secured to the tube. An indicator means is secured within the first metal housing. A second metal housing has an opening therein. The opening of the second metal housing is secured to the tube. An indicator means is secured within the second metal housing. A restriction plate is secured within the inner surface of the tube. The restriction plate has a transmitting aperture formed therethrough. A plurality of securement means, each of which, couples around the outer surface of the tube and couple around the rail.

1 Claim, 4 Drawing Sheets

LASER BEAM TRACK ALIGNMENT SAFETY DEVICE

BACKGROUND OF THE INVENTION

1. Field of the Invention

The present invention relates to a laser beam track alignment safety device and more particularly pertains to providing a safety device for railroad and trolley cars which monitors the alignment of the rails with a laser beam track alignment safety device.

2. Description of the Prior Art

The use of railroad track indicators is known in the prior art. More specifically, railroad track indicators heretofore devised and utilized for the purpose of indicating railroad track irregularities are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,629,583 to Plasser et al. discloses a track position indicating apparatus.

U.S. Pat. No. 3,505,742 to Fiechter discloses an indicator device for continually monitoring deviations from the correct elevation and gauge of railroad tracks.

U.S. Pat. No. 4,490,038 to Theurer et al. discloses a mobile apparatus for determining the lateral position of a railroad track.

U.S. Pat. No. 3,521,066 to Joy et al. discloses a railroad track alignment indicating system employing modulated infrared techniques.

U.S. Pat. No. 3,514,862 to Helgemeir discloses a superelevation and gradient measuring devices for track.

While these devices fulfill their respective, particular objective and requirements, the aforementioned patents do not describe a laser beam track alignment safety device for providing a safety device for railroad and trolley cars which monitors the alignment of the rails.

In this respect, the laser beam track alignment safety device according to the present invention substantially departs from the conventional concepts and designs of the prior art, and in doing so provides an apparatus primarily developed for the purpose of providing a safety device for railroad and trolley cars which monitors the alignment of the rails.

Therefore, it can be appreciated that there exists a continuing need for new and improved laser beam track alignment safety device which can be used for providing a safety device for railroad and trolley cars which monitors the alignment of the rails. In this regard, the present invention substantially fulfills this need.

SUMMARY OF THE INVENTION

In the view of the foregoing disadvantages inherent in the known types of railroad track indicators now present in the prior art, the present invention provides an improved laser beam track alignment safety device. As such, the general purpose of the present invention, which will be described subsequently in greater detail, is to provide a new and improved laser beam track alignment safety device and method which has all the advantages of the prior art and none of the disadvantages.

To attain this, the present invention essentially comprises a tube having an open first end, an open second end, and an intermediate extent therebetween. The tube has an inner surface and an outer surface. The device contains a first metal housing having an opening therein. The opening of the first metal housing is secured to the open first end of the tube. The device contains a laser transmitter secured within the first metal housing. The device contains a second metal housing having an opening therein. The opening of the second metal housing is secured to the open second end of the tube. The device contains a laser receiver secured within the second metal housing. The device contains a restriction plate secured within the inner surface of the intermediate extent of the tube. The restriction plate has a transmitting aperture formed therethrough. The device contains a plurality of tie rods. Each of the tie rods has a first end and a second end. Each first end has an upper securement bracket and a lower securement bracket. The upper securement bracket and the lower securement bracket couple around the outer surface of the tube and are secured thereto by a fastening means. Each second end has an inner bracket and an outer bracket. The inner bracket and the outer bracket couple around the rail and are secured thereto by a fastening means. The plurality of tie rods are situated at interval points along the intermediate extent of the tube.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved laser beam track alignment safety device which has all the advantages of the prior art railroad track indicators and none of the disadvantages.

It is another object of the present invention to provide a new and improved laser beam track alignment safety device which may be easily and efficiently manufactured and marketed.

It is a further object of the present invention to provide a new and improved laser beam track alignment safety device which is of durable and reliable construction.

An even further object of the present invention is to provide a new and improved laser beam track alignment safety device which is susceptible of a low cost of manufacture with regard to both materials and labor, and which accordingly is then susceptible of low prices of sale to the consuming public, thereby making such a laser beam track alignment safety device economically available to the buying public.

Still yet another object of the present invention is to provide a new and improved laser beam track alignment safety device which provides in the apparatuses and methods of the prior art some of the advantages thereof, while simultaneously overcoming some of the disadvantages normally associated therewith.

Even still another object of the present invention is to provide a new and improved laser beam track alignment safety device for providing a safety device for railroad and trolley cars which monitors the alignment of the rails.

Lastly, it is an object of the present invention to provide a new and improved laser beam track alignment safety device with a tube having an inner surface and an outer surface. A first metal housing has an opening therein. The opening of the first metal housing is secured to the tube. An indicator means is secured within the first metal housing. A second metal housing has an opening therein. The opening of the second metal housing is secured to the tube. An indicator means is secured within the second metal housing. A restriction plate is secured within the inner surface of the tube. The restriction plate has a transmitting aperture formed therethrough. A plurality of securement means, each of which, couples around the outer surface of the tube and couple around the rail.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
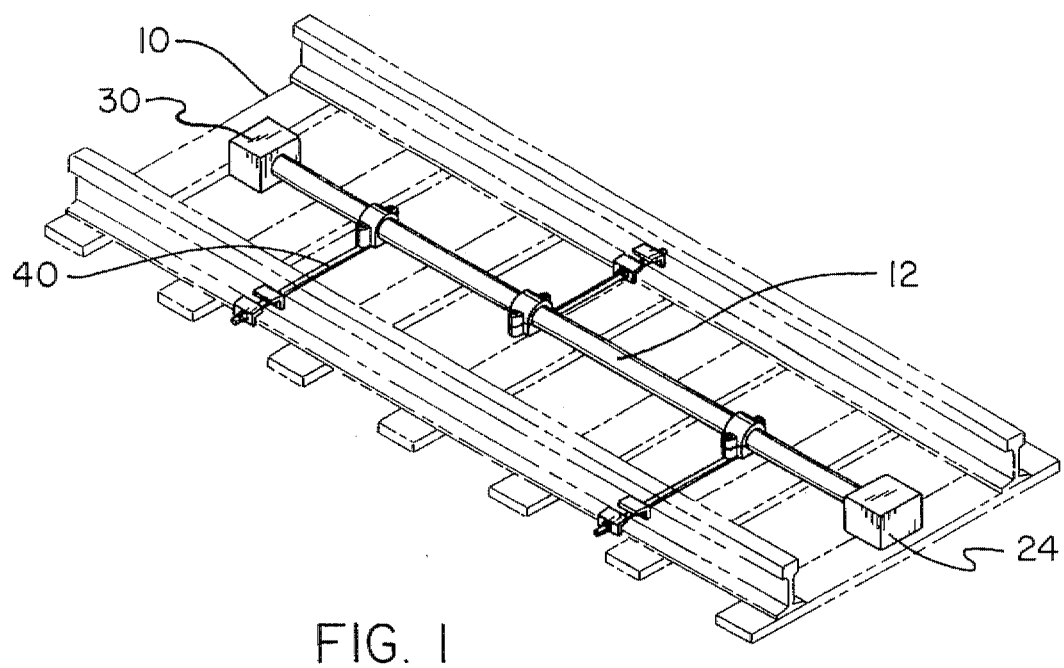
FIG. 1 is a perspective view of the preferred embodiment of the laser beam track alignment safety device constructed in accordance with the principles of the present invention.
Figure 2:
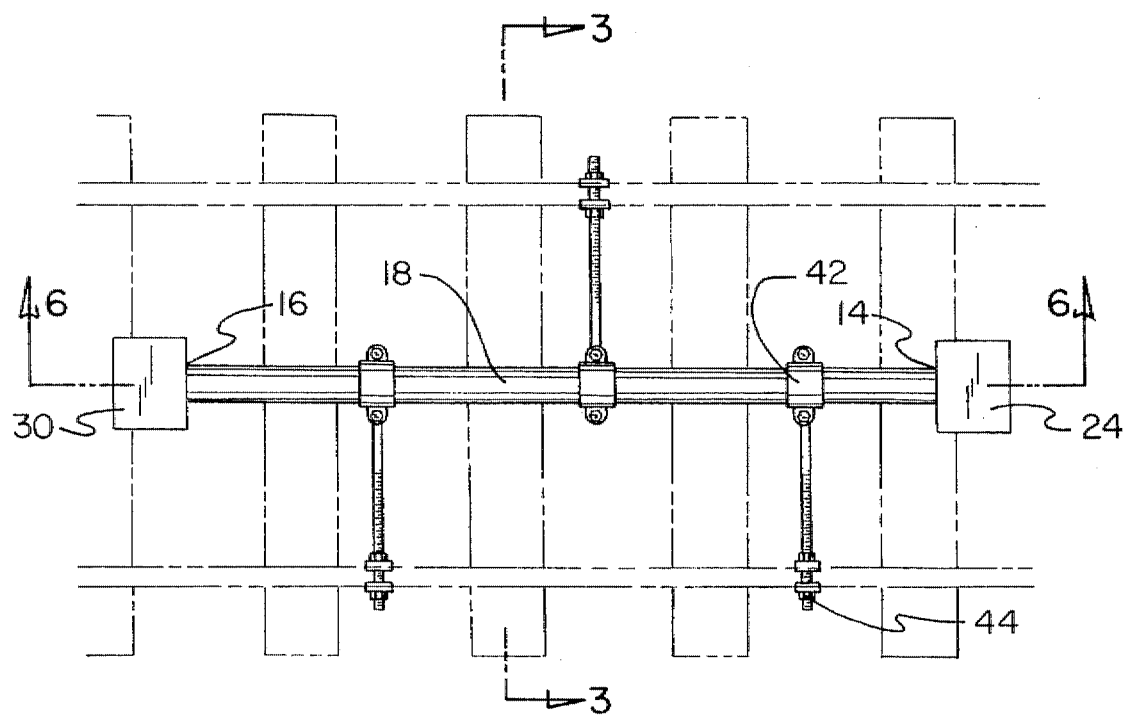
FIG. 2 is a plan view of the preferred embodiment of the present invention.
Figure 3:
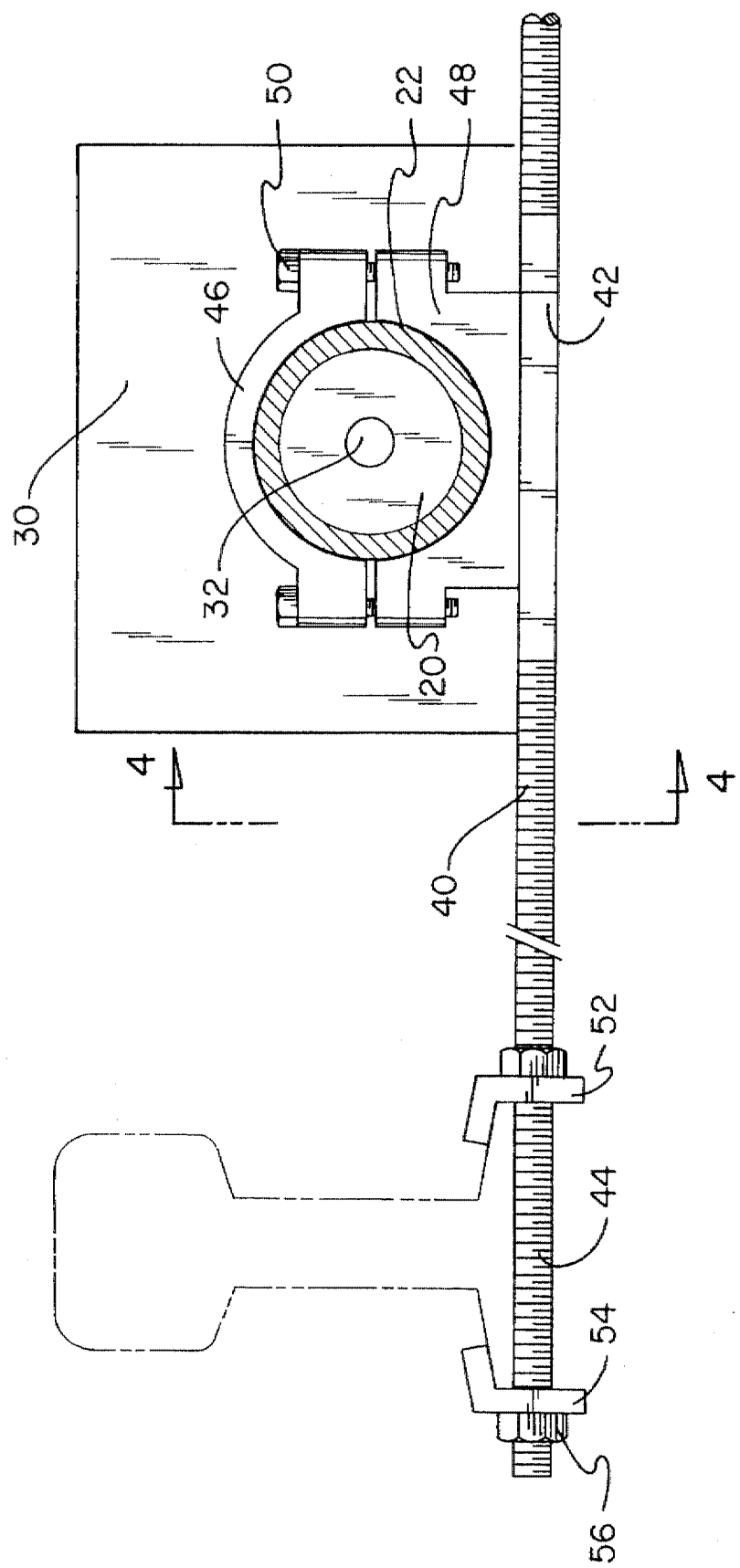
FIG. 3 is a cross-sectional view taken along line 3—3 of FIG. 2.
Figure 4:
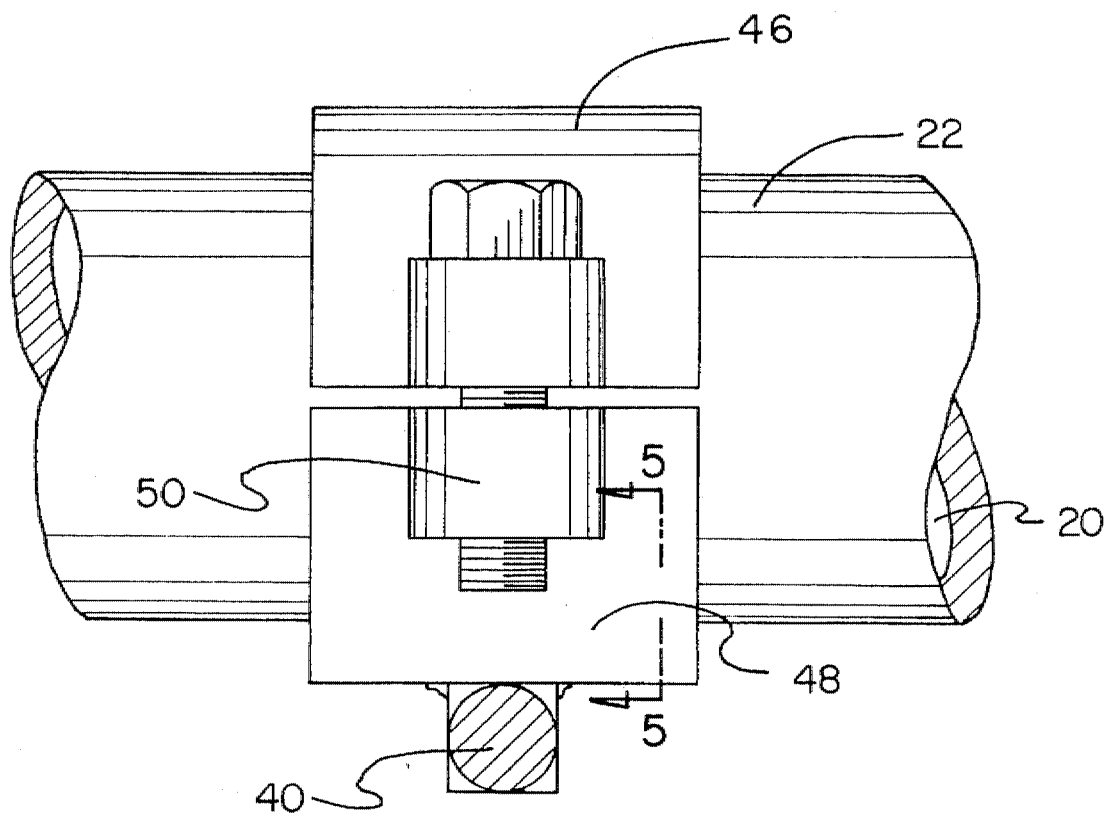
FIG. 4 is a cross-sectional view taken along line 4—4 of FIG. 3.
Figure 5:
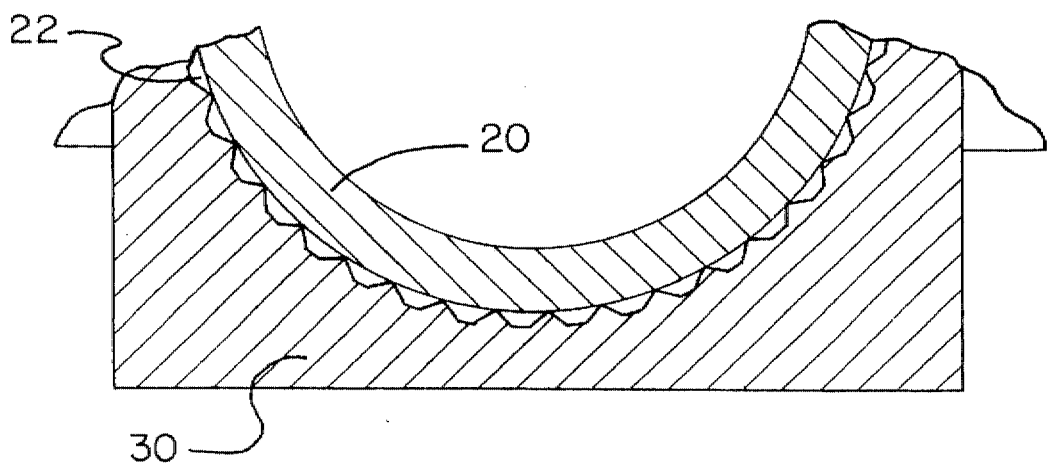
FIG. 5 is a cross-sectional view taken along line 5—5 of FIG. 4.
Figure 6:
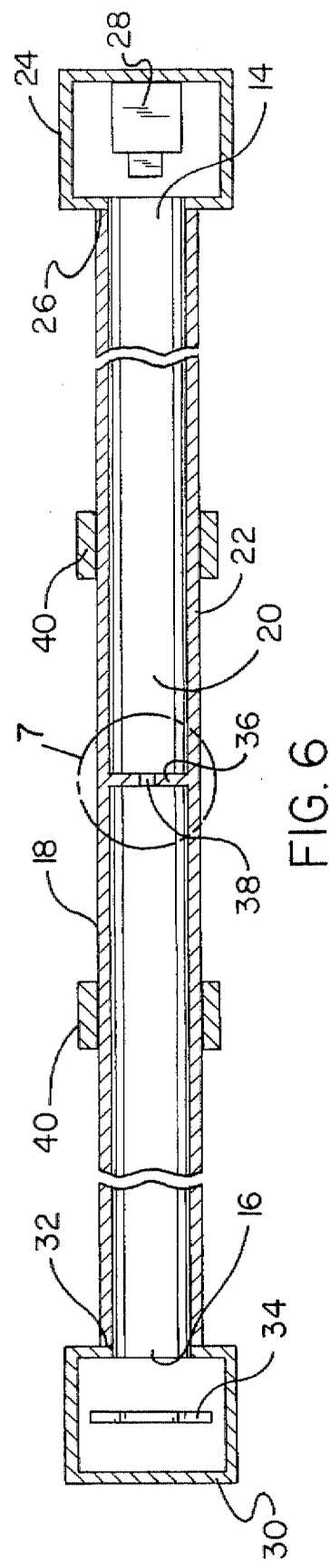
FIG. 6 is a cross-sectional view taken along line 6—6 of FIG. 2.
Figure 7:
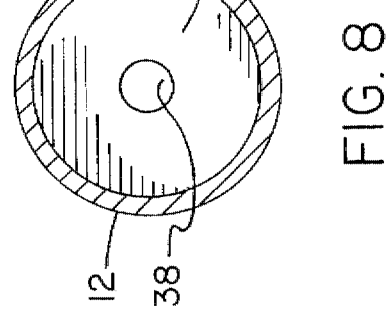
FIG. 7 is a circular section of the tube taken from FIG. 6.
Figure 8:
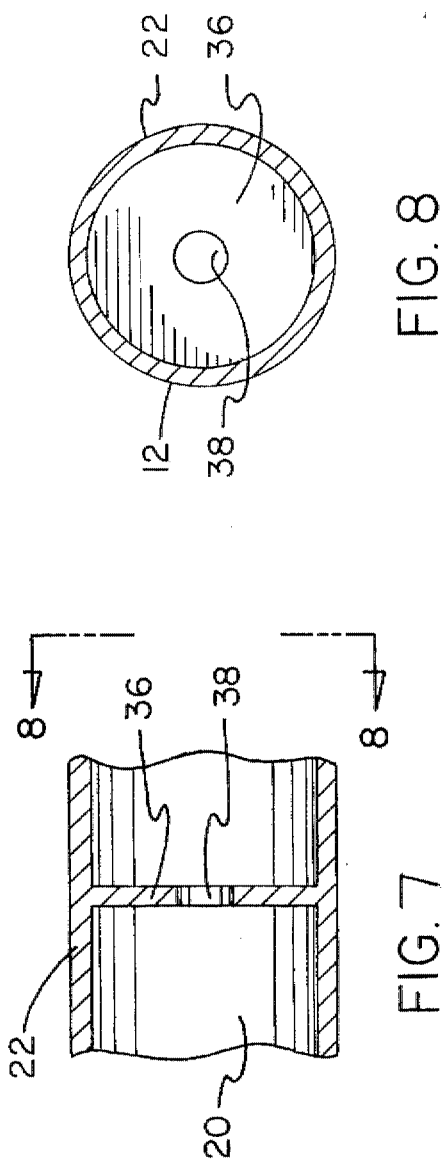
FIG. 8 is a cross-sectional view taken along line 8—8 of FIG. 7.

With reference now to the drawings, and in particular, to FIG. 1 thereof, the preferred embodiment of the new and improved laser beam track alignment safety device embodying the principles and concepts of the present invention and generally designated by the reference number 10 will be described.

Specifically, it will be noted in the various Figures that the device relates to a new and improved laser beam track alignment safety device for providing a safety device for railroad and trolley cars which monitors the alignment of the rails. In its broadest context, the device consists of a tube, a first metal housing, a laser transmitter, a second metal housing, a laser receiver, a restriction plate, and a plurality of tie rods.

The device 10 contains a tube 12 having an open first end 14, an open second end 16, and an intermediate extent 18 therebetween. The tube 12 has an inner surface 20 and an outer surface 22. The tube is preferably constructed of steel and its size and shape would be determined by what tolerances would be allowed.

The device 10 contains a first metal housing 24 having an opening 26 therein. The opening 26 of the first metal housing 24 is secured to the open first end 14 of the tube 12. The first metal housing serves as protection for its contents.

The device 10 contains a laser transmitter 28 secured within the first metal housing 24. The laser transmitter 28 creates a laser beam that is transmitted through the open first end 14 of the tube. The laser transmitter 28 would be part of an electronic circuit that would be monitored at various stations. If a serious mis-alignment occurred, the laser beam would be interrupted and a signal would indicate this. Mis-alignment of the tracks would cause the laser beam to touch the sides of the inner surface 20 of the tube 12. For smaller spans along the track, the laser beam can be substituted by a small sensing wire that would break if misalignment occurred.

The device 10 contains a second metal housing 30 having an opening 32 therein. The opening 32 of the second metal housing 30 is secured to the open second end 16 of the tube 12. As with the first metal housing 24, the second metal housing serves as protection for its contents.

The device 10 contains a laser receiver 34 secured within the second metal housing 30. The laser receiver receives the laser beam as it transmits along the tube 12 and out the open second end 16.

The device 10 contains a restriction plate 36 secured within the inner surface 20 of the intermediate extent 18 of the tube 12. The restriction plate 36 has a transmitting aperture 38 formed therethrough. The size of the transmitting aperture 38 and the placement of the restriction plate 36 can be varied to satisfy individual conditions.

The device 10 contains a plurality of tie rods 40. Each of the tie rods 40 has a first end 42 and a second end 44. Each first end 42 has an upper securement bracket 46 and a lower securement bracket 48. The upper securement bracket 46 and the lower securement bracket 48 couple around the outer surface 22 of the tube 12 and are secured thereto by a fastening means 50. Each second end 44 has an inner bracket 52 and an outer bracket 54. The inner bracket 52 and the outer bracket 54 couple around the rail and are secured thereto by a fastening means 56. The plurality of tie rods 40 are situated at interval points along the intermediate extent 18 of the tube 12.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A new and improved laser beam track alignment safety device for providing a safety device for railroad and trolley cars which monitors the alignment of the rails comprising, in combination:

a tube having an open first end, an open second end, and an intermediate extent therebetween, the tube having an inner surface and an outer surface;

a first metal housing having an opening therein, the opening of the first metal housing secured to the open first end of the tube;

a laser transmitter secured within the first metal housing;

a second metal housing having an opening therein, the opening of the second metal housing secured to the open second end of the tube;

a laser receiver secured within the second metal housing;

a restriction plate secured within the inner surface of the intermediate extent of the tube, the restriction plate having a transmitting aperture formed therethrough;

a plurality of tie rods, each of the tie rods having a first end and a second end, each first end having an upper securement bracket and a lower securement bracket, the upper securement bracket and the lower securement bracket coupling around the outer surface of the tube and secured thereto by a fastening means, each second end having an inner bracket and an outer bracket, the inner bracket and the outer bracket coupling around a lower end of the rails and secured thereto by a fastening means with alternating tie rods securing to opposing rails, the plurality of tie rods being situated at interval points along the intermediate extent of the tube, the plurality of tie rods securing the tube at a position beneath an upper end of the rails at which a railroad or trolley car would be situated for travelling.

\* \* \* \* \*